2,735,970
ELECTRICAL CONDENSERS

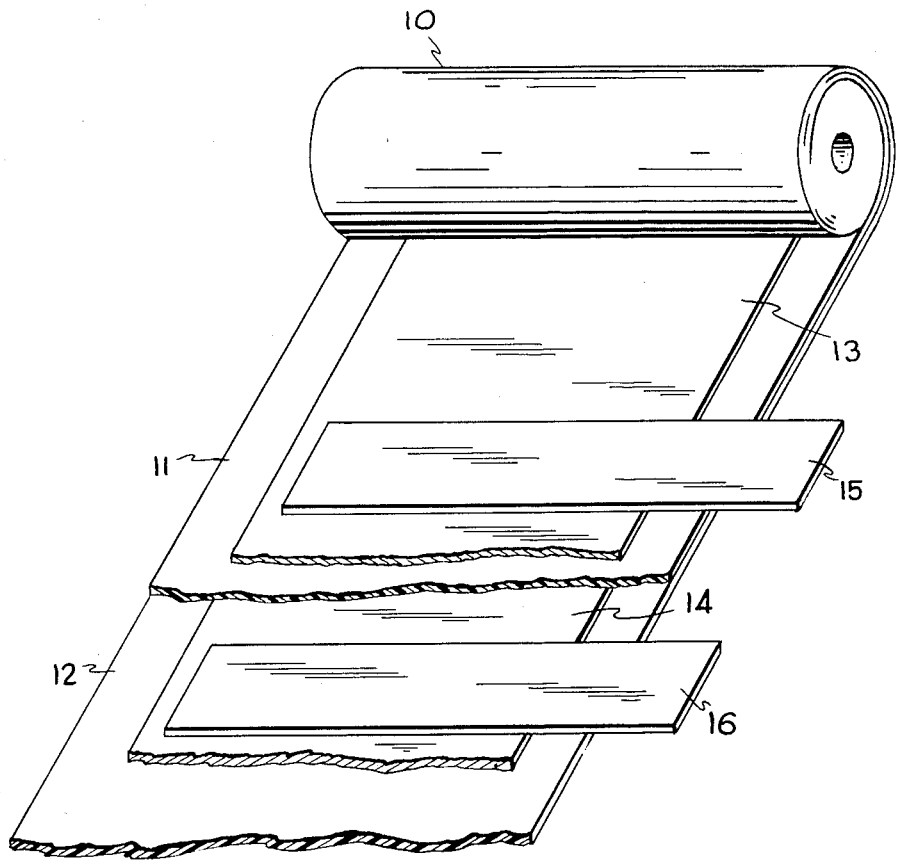
DAVID B. PECK
PRESTON ROBINSON
*INVENTORS.*
BY
THEIR ATTORNEYS

David B. Peck and Preston Robinson, Williamstown, Mass., assignors to Sprague Electric Company, North Adams, Mass., a corporation of Massachusetts Application July 16, 1951, Serial No. 237,049

5 Claims. (Cl. 317—258)

This invention relates to new and improved condensers and to methods of producing these condensers. This application is a continuation in part of copending applications, Serial Numbers 118,198 and 204,546, filed September 27, 1949, and January 5, 1951, respectively.

At the present time it is customary to manufacture small condenser units by rolling together electrode foils and dielectric spacers. The capacitor sections formed in this manner may fail because of small amounts of air entrained within their windings. They are limited in performance because of the physical and electrical properties of the dielectric used to separate the electrodes. Among the presently used dielectric materials is paper, usually impregnated with oil or wax, polymerizable compounds, etc.

Normally, the electrode foils in a so-called inductive capacitor are convolutely wound with the dielectric spacers. At an appropriate point in the winding, tabs are laid against the foils to serve as terminal means for the latter. The winding is then continued. Unfortunately, this laid in tab is not bonded to the electrode foil (unless an expensive and bulky welding operation is conducted) and the resultant contact performance depends upon the pressure on the junction. The low pressure found in a conventional winding causes noise and intermittent open circuits during condenser operation particularly at low voltage. Frequently tabs positioned in the usual manner are so loosely held that they fall out during handling, soldering of terminal wires, etc.

It is an object of this invention to produce condenser sections which are superior to these of the prior art discussed in the preceding paragraphs. Another object is to produce condensers which are not apt to fail due to air pockets entrained within their windings. Further objects of this invention will be apparent from this specification and the appended claims.

The objects of this invention are attained by utilizing the tendency of planar molecularly oriented linear thermoplastic polyester films conforming to the recurrent formula:

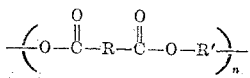

in which R stands for a bivalent radical containing the benzene nucleus, and R' stands for a bivalent aliphatic radical containing from 2 to 8 carbon atoms to shrink when heated to a temperature sufficient to relax or partially disorient their planar molecular orientation.

According to this invention a substantially void free condenser section is formed by convolutely winding alternate electrode layers and planar oriented polyester films so as to form a condenser unit. These units are then heated as indicated above so as to relax the molecular orientation of the polyester films, and so as to cause these films to shrink and tighten the winding into a substantially void free condenser section. Increased volumetric efficiency is noted with these sections.

The required heating of these sections may be accomplished in accordance with one modification of the invention by the use of a common oven. Improved results are achieved when the units are held under reduced pressure while being heated, the pressure being reduced before the units reach the relaxation temperature.

Another modification of the invention concerns the thermal treatment of wound condenser units of the indicated variety in a hot silicone or other oil bath. Such treatment not only accomplishes the desired planar disorientation in a rapid, uniform manner, but also serves to protect the margins of the units against corona breakdown. This protection is increased when the heated units are cooled in the oil bath.

A further embodiment of this invention makes use of the tendency of the polyesters conforming to the above general formula to shrink when heated as indicated to establish a high and uniform condenser tab-to-electrode foil pressure in wound capacitance units. Preferably the tabs are positioned in a condenser unit inside of the electrode foils. Any of the heating methods of the preceding modifications may be satisfactorily used to secure these tabs. Freedom from noise and intermittent open circuits results from this treatment.

The preferred polyester used in accordance with this invention is a linear condensation polymer of terephthalic acid and ethylene glycol sold under the trade name "Terylene." This resin reduces in area from 2 to 20% when heated at temperatures of from 165° C. to 218° C., the amount depending upon the polymer size and the degree of initial planar orientation. Other acceptable polyesters conforming to the above noted general formula are the condensation polymers of terephthalic acid and various alkane diols such as propylene glycol or butylene glycol, and the condensation polymers of the chlorinated or otherwise substituted dibasic aromatic acids with substituted and unsubstituted glycols. It is preferred to employ starting materials which will condense to form a linear, readily oriented chain. Thus p-substituted aromatic compounds are preferred to meta substituted compounds. The desired planar orientation may be accomplished by stretching the film in two directions at a temperature below the relaxation temperature.

For purposes of clarity, the "shrinkage" referred to herein refers to reduction in two of the three dimensions of the polyester film. There is no appreciable volume change. Hence, in most systems, the shrinkage of width and length of a thin film is compensated by an increase in film thickness (which assists in removing voids). The "planar orientation" means the orientation of the molecules in two directions, usually those indicated above. The degree of this orientation and of the disorientation resulting from any given heat treatment will depend upon the orienting conditions.

According to the initially indicated modification of the invention condenser sections wound with planar oriented polyester films conforming to the above formula are heated, as in an oven, in order to relax the molecular orientation of these dielectric films, and cause them to shrink in area. During this heating step the polyester films contract against the inner wound layers of the unit. This forces entrained air from these windings and from the edges. The use of reduced pressure aids in this removal of air. The partially disoriented films resulting from the treatment when unwound from a capacitor of this type tend to return to their wound coiled positions.

The exact temperatures and times required to relax the planar molecular orientation of these wound condenser sections will vary with the specific polyesters used, the thickness of the various wound layers, and the total size of the wound unit. One-half inch diameter "one paper" condenser units wound using quarter mil aluminum electrode foils and one mil "Terylene" molecularly oriented dielectric films are satisfactorily treated in a 200° C. oven for a period of 30 minutes. Optimum results are obtained when the same conditions are used to treat the sections but with the further condition of reduced pressure, as for example, 150 microns of mercury. With "Terylene" films any temperature between about 165° C. and 218° C., and any pressure less than about 3000 microns of mercury appear to be satisfactory. The time of heating will of course vary with other factors as indicated above.

Other heating methods besides the indicated convection method may be employed with this modification of the invention. For example, induction heating may be used.

In the second modification of the invention the heating is carried out by dipping wound units of the type indicated in the above example in hot baths for the periods sufficient to cause the dielectric polyester resin films to shrink and thus to force any entrained air from the units. The temperatures and times of heating necessary will of course vary with the specific resin used, and with the other factors indicated in the preceding example are treated with hot silicone oil bath maintained at 200° C. for a period of 30 minutes. This treatment serves not only to shrink this "Terylene" and form a tight, substantially void free unit, but also to protect the edges and margins of this unit and assist in the sealing of the edges. Extended foil capacitors are particularly benefited by this treatment in an oil bath.

This edge sealing effect increases slightly as higher temperatures are used, and is obtained with any oil bath, providing that the oil does not chemically attack the film. The various silicone oils, the fluorinated kerosenes, perfluoroaromatics, perfluoroamines, high boiling hydrocarbon oils and other similar oils are effective with this modification of the invention.

The effectiveness of the oil treatment may be increased by cooling the treated units in an oil bath. Oil heated units of the type indicated in the above example are satisfactorily cooled by immersion for a period of 2 hours in a silicone oil bath which is allowed to cool from 200° C. to about 80° C. This cooling in an oil bath is employed advantageously with condenser units using the indicated type of polyester dielectric spacer which has been heated in any of the indicated manners including in particular the extended foil type. It is believed that this cooling under oil is effective because oil is drawn into the edges of the wound units.

The method of utilizing the tendency of polyester films conforming to the indicated formula to shrink in order to position electrode tabs is most easily understood with reference to appended drawing, in which Figure 1 diagrammatically shows a method of winding a condenser with these tabs.

In this figure a wound condenser unit 10 is shown as formed by winding alternate electrode foils 13 and 14 and molecularly oriented polyester films 11 and 12. In winding this unit the tabs 15, 16 are preferably inserted inside the electrodes as they are being wound into position. Any of the known methods of winding condenser sections may of course be employed with this modification although only the "one paper" variety of winding is shown. After a condenser section is wound with the tabs in position the unit is then heated so as to shrink the dielectric spacers and relax their planar molecular orientation. This heating causes a tight contact between the foils and the tabs, when carried out in an oven, under a vacuum, or by dipping in an oil bath or by various electrical methods known to the art. With small ½" wound units of the type indicated above in which the dielectric is "Terylene" the heat treatment is preferably performed at 200° C. for a period of approximately 30 minutes. Here again, however, temperatures of from 165 to approximately 218° C. have been satisfactorily employed. The tab-electrode foil contact will be under compression at all operating temperatures of the capacitor, below that maximum temperature met during the thermal treatment of the wound capacitor.

After the heating of the capacitor above the relaxation temperature, the unit may be molded, canned or otherwise encased, if this is considered advisable. With high temperature heat treatments, e. g., on the order of 210° C., it is not necessary to provide an external casing, unless humidity and immersion extremes are to be met in actual operation.

As indicated above, the temperature of treatment should be above the maximum intended operational temperature of the capacitor, in order that the electrode-tab junction may be maintained under compression throughout the operating temperature range of the capacitor.

According to a limited embodiment of the invention, capacitors are impregnated with oil, wax or resin by the sequential process of subjecting the capacitors to reduced pressure at temperature substantially below the relaxation temperature, introducing the impregnant in liquid state, then optionally increasing the pressure to atmospheric, and finally, raising the temperature to a value substantially in excess of the relaxation temperature of the polyester. If polymerizable impregnants, such as polyester-styrene mixtures, N-vinyl carbazole, diallyl phthalate etc., are employed, the thermal treatment can be used also to polymerize these materials into the hard, resinous state.

We claim:

1. A process of forming a substantially void free cylindrical condenser section which comprises convolutely winding electrode layers and planar oriented substantially linear dielectric polyester film spacers conforming to the recurrent formula:

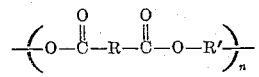

wherein R stands for a bivalent radical containing the benzene nucleus, and R' stands for a bivalent aliphatic radical containing from 2 to 8 carbon atoms into a wound condenser unit, and heating said unit to between 165 and 218° C. for a period sufficient to relax the planar orientation of said polyester spacers.

2. A substantially void-free capacitor of convolutely wound electrodes and dielectric resin films, the resin being a substantially linear polyester having the recurrent formula

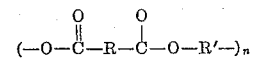

where R stands for a bivalent radical containing the benzene nucleus and R' stands for a bivalent aliphatic radical containing from 2 to 8 carbon atoms, the resin having been relaxed in situ from oriented condition at a relaxation temperature of 165 to 218° C.

3. The process of claim 1 in which the heating is effected by immersing the capacitor in a heated impregnation oil.

4. The process of claim 1 in which the polyester is polyethylene terephthalate.

5. The product of claim 2 in which the polyester is polyethylene terephthalate.

References Cited in the file of this patent

UNITED STATES PATENTS

| Number | Name | Date |
|---|---|---|
| 836,863 | Clausen | Nov. 27, 1906 |
| 1,010,936 | Meirowsky | Dec. 5, 1911 |
| 1,094,718 | Honold | Apr. 28, 1914 |
| 2,177,266 | Schupp et al. | Oct. 24, 1939 |
| 2,256,160 | Britton | Sept. 16, 1941 |
| 2,454,625 | Bondon | Nov. 23, 1948 |
| 2,456,381 | Clark | Dec. 14, 1948 |
| 2,479,400 | Pecoroni | Aug. 16, 1949 |
| 2,497,376 | Swallow et al. | Feb. 14, 1950 |
| 2,548,862 | Brandt | Apr. 17, 1951 |
| 2,623,096 | Robinson | Dec. 23, 1952 |